Jan. 27, 1931.                    R. R. WARE                    1,790,293
                                   ROLLER
                              Filed Oct. 3, 1928
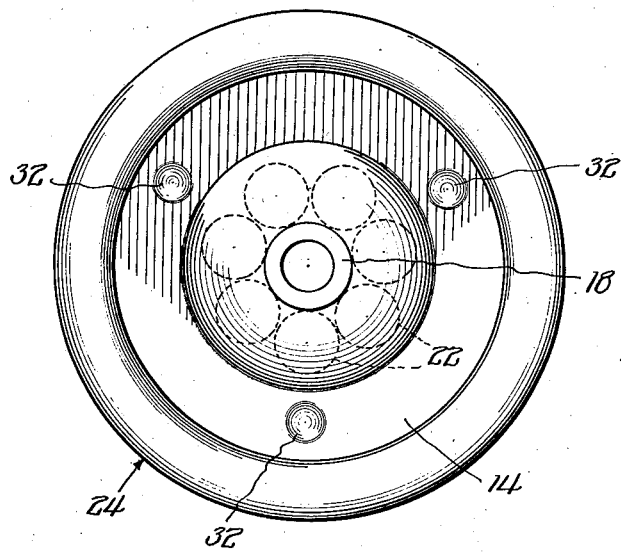
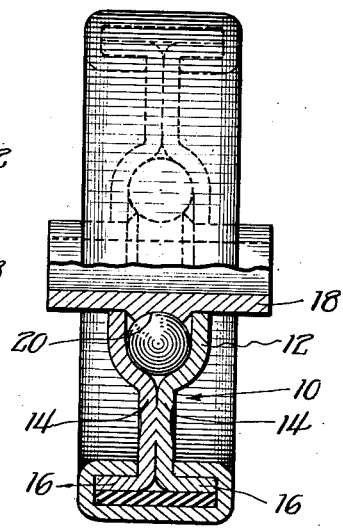
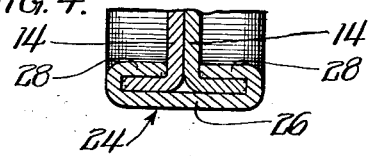
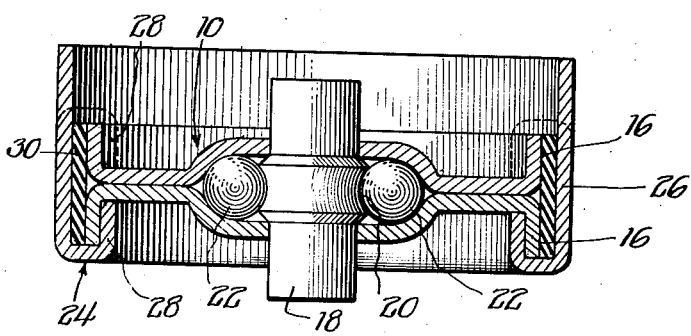
INVENTOR:
ROBERT R. WARE,
By Cheever & Cox ATTYS.

Patented Jan. 27, 1931

1,790,293

UNITED STATES PATENT OFFICE

ROBERT R. WARE, OF CHICAGO, ILLINOIS, ASSIGNOR TO CHICAGO ROLLER SKATE COMPANY, OF CHICAGO, ILLINOIS, A CORPORATION OF ILLINOIS

ROLLER

Application filed October 3, 1928. Serial No. 310,096.

My invention relates to rollers and particularly to rollers adapted to be used for skates.

In general, one of the primary objects of my invention is to provide a roller of rigid and economical construction which is comprised of a minimum number of parts which may be very readily assembled.

Another object of my invention is to provide a roller having a metallic tread, said tread being rigidly secured in position so as to prevent distortion thereof after the roller has been subjected to considerable wear.

A still further and more specific object of my invention is to provide a metallic roller which is particularly adaptable for roller skates and the like, said roller being comprised of a pair of bushing members or plates and a metallic tread secured to the peripheral flanges of said bushings in such a manner as to secure the marginal portions of said tread against distortion which normally results from continued and hard usage.

Still another object of my invention is to provide a metallic roller which is comparatively noiseless in operation and to this end I propose to insert a sound deadening member between the metallic tread of the roller and the outer portions of the bushing.

These and other objects will be more apparent from the following detailed description when considered in connection with the accompanying drawing, wherein—

Figure 1 is a side elevational view of a roller embodying features of my invention;

Figure 2 is an elevational view of the roller as viewed from the right of Figure 1 with the lower half thereof shown in section for the purpose of more clearly disclosing the structural characteristics thereof;

Figure 3 is a central transverse sectional view of the roller disclosing the manner in which the various parts which constitute the roller are assembled prior to the final tread bending operation; and Figure 4 is a fragmentary sectional view of a roller in which the tread directly engages the peripheral surface of the bushing flanges.

Referring now to the drawing more in detail wherein like numerals have been employed to designate similar parts throughout the various figures, it will be observed that my invention contemplates the provision of a pair of bushing members which I have indicated generally by the numeral 10. These bushing members comprise a ball housing portion 12, a web 14 and annular flanges 16 disposed at substantially right angles with respect to the web 14. The housing 12 is apertured to receive a hub 18 which is provided with an external ball race 20. Mounted within the ball race 20 and enclosed within the bushing housing 12 are a plurality of ball bearings 22.

In order to provide a rigid metallic tread I enclose the bushing flanges 16 within an annular cup or member 24. The medial portion of this member 24 provides a tread 26 while the marginal portions 28 are bent so as to be securely clamped in position against the flanges 16 and the webs 14. In order to reduce to a minimum the noise which is occasioned when a metallic roller passes over a hard surface such as a pavement, I provide an annular sound deadening member 30 between the inner surface of the tread 26 and the peripheral surface of the flange 16. This annular deadening member 30 may be constructed of hard rubber, fabric or other material having the desired sound deadening qualities. In instances where the sound deadening member 30 is not required, the inner surface of the tread 26 may be positioned immediately adjacent the peripheral surface of the flanges 16 as clearly shown in Figure 4.

It will be apparent from Figure 3, that by constructing a roller in the manner just described, the assembling of the various parts thereof is greatly expedited. Thus the cup or member 24 is first bent along one margin thereof by any suitable pressing operation and positioned in the manner shown in Figure 3. The deadening member or ring 30 may now be inserted and then the lowermost bushing 10 may be positioned with the flange 16 thereof between the member 30 and the flange 28. The hub 18 and the ball bearings 22 may now be positioned within the lowermost bushing 12 and subsequently thereto the companion bushing may be lowered into position. When all the parts have been thus assembled, a suitable pressing operation will serve to bend the uppermost marginal portion 28 of the positioned cup member 24 into clamping relation with respect to the flange 16 companioned thereto. From the foregoing it will be apparent that the bushing members 10 are positively secured in accurate alignment during the bending or forming of the cup member 24 and obviously this serves to insure the production of rollers which are symmetrically shaped and hence which effect true operating conditions. After the member 24 has been clamped into position so as to securely bind the web portions 14 together as well as to clampingly engage the flanges 16, spot welds 32 may be made at spaced positions along the webs 14 so as to positively bind these webs together.

A metallic roller constructed in accordance with the teachings of my present invention will be very durable and economical in construction and will stand up under the severest operating conditions. In this connection attention is directed to the manner in which the member 24 is clamped in position against the flanges 16. One of the difficulties which has heretofore been experienced in using steel rollers on skates is that of constructing the tread thereof so as to meet the severe operating conditions which are normally incident to its use. In other words, it has heretofore been difficult to maintain the flatness of the tread over an appreciable period of time because of the fact that the treads heretofore used have not been sufficiently rigid in construction. It will be observed that by bending the marginal portions 28 of the cup member 24 over the flanges 16, I provide a reinforcing means which serves to hold up or in other words prevent the flanges 16 from being bent inwardly when the tread is subjected to operating pressures. Thus, any tendency for the flanges 16 to bend inwardly will be counteracted by the clamping action of the marginal portions 28 and hence the desired flatness of the tread will be unimpaired. It will also be seen that the bent portions 28 not only serve to hold up the bushing flanges 16 but also serve to clampingly engage the bushing webs 14 so as to bind said webs together. This binding effect co-operates with the binding force of the spot welds 32 to positively secure the webs against separation. As already pointed out, the annular bent portion of the outer tread serves to retain the bushing members in concentric relation during the initial assembling thereof and thereby eliminates the possibility of any shifting thereof prior to the welding operation so as to assure the production of a true running roller. Even though the entire tread 26 be worn away, the flanges 16 of the bushing members 10 will still be held in proper concentric alignment. In instances where the use of the deadening member or ring 30 is not required, the construction shown in Figure 4 may be used. The bushing 10 serves as a combined or unitary side plate and bushing for the roller and by employing this unitary construction, the number of parts constituting the roller are reduced to a minimum.

Having thus described my invention, what I claim as new and desire to secure by Letters Patent is:

1. A ball bearing roller having a hub provided with a raceway for balls, a bushing encircling the hub provided with a co-operative raceway, said bushing having a lateral flange, a sound deadening member encircling the peripheral surface thereof, and an annular tread member having a marginal portion thereof bent over said flange whereby the sound deadening member is secured in position and the flange is reinforced.

2. A ball bearing roller having a hub provided with a raceway for balls, a bushing encircling the hub provided with a co-operative raceway, said bushing comprising a pair of connected members of symmetrical construction having companion lateral flanges formed along the peripheral margin thereof, and a tread member bearing against the outer and inner surfaces of the flanges and abutting opposed portions of the outer surfaces of the bushing so as to reinforce said flanges and to secure the bushing members together.

3. A ball bearing roller having a hub provided with a raceway for balls, a bushing encircling the hub, said bushing comprising a pair of symmetrically formed parts, axially arranged and secured together, the inner portion of said parts providing a complete outer housing for balls within the raceway of the hub, the outer portion of said members being formed with lateral flanges, and an annular tread member having a flat annular surface bearing against the peripheral surfaces of the flanges and marginal portions clampingly engaging the greater portions of the inner surfaces of the flanges so as to provide a rigid roller tread and for preventing the inward distortion of the flanges in response to pressures applied to the external surface of the tread.

4. A ball bearing roller comprising a hub, ball bearing equipment carried by said hub, a pair of side plates encircling said hub, said side plates having contacting surfaces, means to secure said side plates together, the inner portion of said side plates being concaved so as to retain said ball bearing equipment in position between said plates, the outer portions of said side plates having annular lateral flanges, and a tread member bearing against the peripheral surface of at least one of said flanges and bent to engage the outer edge thereof.

5. A ball bearing roller having a hub provided with a raceway for balls, side plates encircling the hub, said side plates comprising a pair of symmetrically formed parts, means to secure said side plates together, the inner portion of said parts providing a complete housing for the ball bearing equipment of the roller, the outer portion of said parts being formed with lateral flanges, and an annular tread member bearing against the peripheral surface of at least one of the flanges and having marginal portions bent to engage at least one of said flanges so as to provide a rigid roller tread.

6. In a ball bearing roller for roller skates comprising a hub, ball bearing equipment carried by said hub which includes a single row of balls arranged around said hub, a pair of side plates encircling said hub, said side plates being adapted to be adjacently positioned, means for securing said side plates together, the inner portion of said side plates being concaved so as to retain said single row of ball bearings in position between said plates, the outer portions of said side plates having annular lateral flanges, and a tread section bearing against the peripheral surface of at least one of said flanges and bent over the outer edge thereof so as to provide a support therefor.

7. In a ball bearing roller for roller skates comprising a hub, ball bearing equipment carried by said hub which includes at least one row of balls arranged around said hub, a pair of side plates encircling said hub, said side plates being adapted to be adjacently positioned, means for securing said side plates together, the inner portion of said side plates being concaved so as to retain said ball bearings in position between said plates, the concaved inner surfaces of said plates directly engaging the ball bearings and providing the sole side housing therefor, the outer portions of said side plates having annular lateral flanges, and a tread section bearing against the peripheral surface of at least one of said flanges and bent over the outer edge thereof so as to provide a support therefor.

8. In a ball bearing roller for roller skates comprising a hub, ball bearing equipment carried by said hub which includes at least one row of balls arranged around said hub, a pair of side plates encircling said hub, said side plates being adapted to be adjacently positioned, means for securing said side plates together, the inner portion of said side plates being concaved so as to retain said ball bearings in position between said plates, the outer portions of said side plates having annular lateral flanges, and a tread section bearing upon the outer surfaces of the flanges of said side plates and bent over said flanges at each edge thereof and bearing against the inner portion in such a manner as to exert an outward force tending to strengthen said flanges when the tread is subjected to the wear and force incident to the use of the skate with which it may be associated.

9. A ball bearing roller comprising a hub, ball bearing equipment carried by said hub, a pair of side plates encircling said hub, said side plates being adapted to be juxta-positioned, means for securing said side plates together, the inner portion of said side plates being concaved so as to retain said ball bearing equipment in position between said plates, the outer portions of said side plates having annular lateral flanges, and a tread section bearing against the peripheral surface of at least one of said flanges and extending over the side and inwardly of said flange sufficiently to provide a support therefor.

In witness whereof, I have hereunto subscribed my name.

ROBERT R. WARE.